(12) United States Patent
Wu et al.

(10) Patent No.: US 9,515,878 B2
(45) Date of Patent: Dec. 6, 2016

(54) METHOD, MEDIUM, AND SYSTEM FOR CONFIGURING A NEW NODE IN A DISTRIBUTED MEMORY NETWORK

(71) Applicant: Software AG USA Inc., Reston, VA (US)

(72) Inventors: Tim Wu, Fremont, CA (US); Yauheni Sheliastovich, Lesnoy (BY); Alex Radeski, San Francisco, CA (US)

(73) Assignee: Software AG USA Inc., Reston, VA (US)

( * ) Notice: Subject to any disclaimer, the term of this patent is extended or adjusted under 35 U.S.C. 154(b) by 145 days.

(21) Appl. No.: 14/540,097

(22) Filed: Nov. 13, 2014

(65) Prior Publication Data

US 2016/0142249 A1  May 19, 2016

(51) Int. Cl.
*H04L 12/24* (2006.01)
*H04L 29/08* (2006.01)
*G06F 3/06* (2006.01)

(52) U.S. Cl.
CPC ......... *H04L 41/0806* (2013.01); *G06F 3/0604* (2013.01); *G06F 3/0631* (2013.01); *G06F 3/0632* (2013.01); *G06F 3/0683* (2013.01); *H04L 67/1097* (2013.01)

(58) Field of Classification Search
CPC .... H04L 41/08; H04L 67/1097; G06F 3/0683; G06F 3/0632; G06F 3/0604
See application file for complete search history.

(56) References Cited

U.S. PATENT DOCUMENTS

| | | | |
|---|---|---|---|
| 8,352,425 B2 | 1/2013 | Bourbonnais et al. | |
| 2007/0043804 A1* | 2/2007 | Fibaek | H04H 60/04 709/201 |
| 2014/0359755 A1* | 12/2014 | Beitel | G06F 21/76 726/18 |

OTHER PUBLICATIONS

Jim Gray et al., "The Dangers of Replication and a Solution", proceedings of the 1996 ACM SIGMOD Conference at Montreal, pp. 173-182, May 1996.
Avinash Lakshman and Prashant Malik, "Cassandra—A Decentralized Structured Storage System", ACM SIGOPS Operating Systems Review, vol. 44 Issue 2, pp. 35-40, Apr. 2010.
Yasushi Saito and Marc Shapiro, "Optimistic Replication", ACM Computing Surveys, vol. 37, No. 1, pp. 42-81, Mar. 2005.
Marc Shapiro et al., "Convergent and Commutative Replicated Data Types", Bulletin of the European Association for Theoretical Computer Science, No. 104, pp. 67-88, Jun. 2011.
Werner Vogels, "Eventually Consistent", Communications of the ACM, vol. 52, No. 1, pp. 40-44, Jan. 2009.

* cited by examiner

*Primary Examiner* — Kim T Nguyen
(74) *Attorney, Agent, or Firm* — Posz Law Group, PLC

(57) ABSTRACT

A provisioned node, which is to be added into a distributed memory network, creates an empty provisioned key/value map. A master node, which is an existing node, in the distributed memory network, maintains existing key/value entries in an existing key/value map. An update cycle is performed, which includes receiving, by the master node and the provisioned node, one or more changes to the existing key/value entries. For any change that is a remove operation, the provisioned node stores a key specified in the remove operation in a tombstone set, and further removes the specified key from the provisioned key/value map. For any change that is a put operation of a specified key/value pair, the provisioned node puts the key/value pair in the provisioned key/value map.

18 Claims, 12 Drawing Sheets

419 → FINAL

407 → MASTER CONTENT        REPLICA CONTENT ← 409

| KEY | VALUE |
|-----|-------|
| k1  | v7    |
| k2  | v3    |
| k3  | v3    |
| k6  | v6    |

| KEY | VALUE |
|-----|-------|
| k1  | v7    |
| k2  | v3    |
| k3  | v3    |
| k6  | v6    |

FIG. 4H

METHOD, MEDIUM, AND SYSTEM FOR CONFIGURING A NEW NODE IN A DISTRIBUTED MEMORY NETWORK

TECHNICAL FIELD

The technical field relates in general to distributed memory, and more particularly to a time and space efficient manner of bootstrapping a new node in a distributed memory network.

BACKGROUND

Organizations of all types are adapting to a world economy where it is necessary to have efficient processing of data across the globe. An operational model where an organization operates a single, medium or large scale memory for its computing needs in the organization's home country is for all intents and purposes a thing of the past. A new operational model for many organizations relies on a distributed memory system of large memory nodes, operating as both end points and connecting points, which are physically located in many different countries where an organization does business or operates.

A primary advantage of the new operational model is that local memory in a distributed memory network improves latency and avoids bottlenecks for local users. While this advantage is sizeable, there also exists a drawback in the new operational model. Specifically, in a worldwide distributed memory system each node (local memory) has to maintain replica data of a master set of data. Therefore, when a new node is added to the distributed memory network the new node must acquire all the historical data from the master set of data. A newly added node in the distributed memory network is sometimes referred to as a "provisioned node" or a "newly provisioned node" or a "node being bootstrapped."

Conventionally, data synchronization between nodes can be aided by time stamping of incoming changes. Provided that all timestamps are accurate, and that their resolution is high enough (usually in milliseconds), a "youngest" timestamp determines a most recent change. A process of time stamping can also be utilized for replicating key/value stores, since the most recent change is the relevant operation in a replication scenario. Unfortunately, enormous synchronization problems may occur using time stamping.

One process of replicating key/values stores is to freeze every input, and to make a complete copy of the key/value pairs. This is sometimes known as a "stop the world" approach. That is to say, every time a new node is provisioned the entire distributed memory network is temporarily taken offline while a copy of the key/value pairs in the master data is provided to the new, replica node. It should be clear that this is not an efficient use of resources.

SUMMARY

Accordingly, an embodiment disclosed herein provides a method of configuring a provisioned node, the provisioned node to be added into a distributed memory network. A master node is an existing node in the distributed memory network, the master node maintaining existing key/value entries in an existing key/value map. The method comprises creating, by the provisioned node, a provisioned key/value map that is initially empty. Alternatively, a provisioned node with an existing key/value map is provided, the provisioned node simply clearing its existing map to reach an empty state.

The provisioned node and the master node perform an update cycle. The update cycle includes receiving, by the master node and the provisioned node, one or more changes to the existing key/value entries. The update cycle also specifies that for any change in the one or more changes that is a remove operation of a specified key, the provisioned node stores the specified key in a tombstone set, and removes the specified key from the provisioned key/value map when the specified key exists in the provisioned key/value map.

The update cycle also specifies that for any change in the one or more changes that is a put operation of a specified key/value pair, the provisioned node deletes the key of the specified key/value pair from the tombstone set when the key of the key/value pair exists in the tombstone set. The provisioned node further puts the key/value pair in the provisioned key/value map. Also disclosed and claimed herein are a distributed memory network and a non-transitory storage medium featuring the immediately foregoing functionality.

It should be noted that the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIGS. 4A-4H are diagrams illustrating both providing current changes and batches of historical data in an bootstrapping process;

DETAILED DESCRIPTION

I. Introduction

Figure 1:
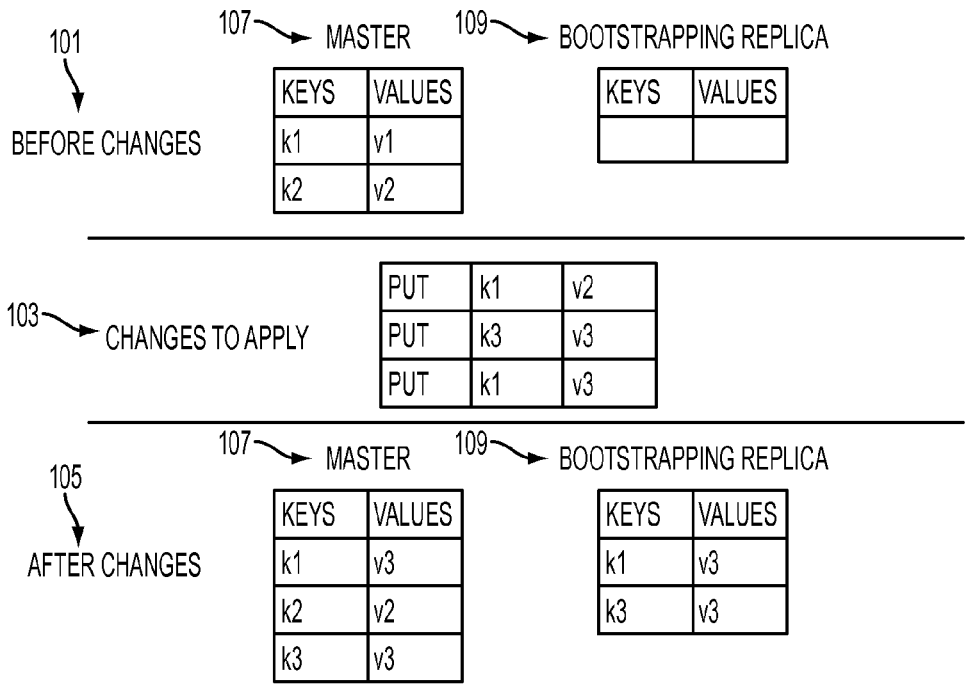
FIG. 1 is a diagram illustrating put operations in a key/value bootstrapping process.

In overview, the present disclosure concerns a lightweight mechanism for provisioning replicated nodes, sometimes referred to herein as a "provisioned node," in a distributed environment. Rather than relying on conventional approaches which use, for example, complex synchronization for extremely accurate timestamps or high overhead buffering, the approach discussed herein plays to the strengths of a key/value store (for example using an available system such a Software AG's Big Memory), and can simplify the process for updating key-value pairs.

As further discussed herein below, various inventive principles and combinations thereof are advantageously employed so that the node being bootstrapped will start right away with the most recent changes, rather than provisioning the historical data first. Accordingly, the node being bootstrapped creates a fresh key-value map based on the latest information. As well, in a scenario where a node is being re-initialized, the node being bootstrapped could also clear an existing key-value map.

Historical data can be loaded afterwards in batches, perhaps with lower priority, avoiding disadvantages such as so-called stop-the-world pauses. To manage the discrepancies between historical data and the current changes, only a tombstone set keeping track of remove operations would be required. It should be quickly noted that an empty key/value map and tombstone set are data structures preferably kept within the provisioning node.

Further in accordance with exemplary embodiments, methods, systems, and devices are provided for a very lightweight approach which relates to a distributed memory cache and to rapidly and efficiently bring a replica node, which is being bootstrapped, into conformance with the memory indicated at a master node.

II. State of the Art

There are several conventional distributed memory systems available in the marketplace today, represented by Terracotta BigMemory by Software AG, Cassandra, and Hazelcast. Each of these is discussed below, together with some observations by the inventors.

A. Cassandra

In Cassandra, bootstrapping and/or configuring a new node is primarily streaming Sorted String Tables (SSTables) from the live nodes to the new nodes (the new ones are empty). Thus after defining the key ranges for the nodes (which is a very fast operation), the rest can be seen as a simple copy over network operation. Unlike node repair, this process is considered blocking; that is to say the new node is not available until it is fully synced. For more information about Cassandra, please see http://wiki.apache.org/cassandra/.

B. Hazelcast

In Hazelcast if a user wants to bring a dead node back after a failure, and there is some data on the dead node, then Hazelcast will try to perform a merge operation. On startup, the node sends a merge request for each of its locally owned map entries. When an entry merges into the cluster, there might be an existing entry with the same key already. Values of these entries might be different for that same key. An issue arises as to which conflicting value should be accepted as final for the key.

In Hazelcast, the "cluster coordinator," which is a Hazelcast node, decides how to handle merging entry (resolve conflict) based on the configured MergePolicy for that map. There are various built-in merge policies. These built-in merge policies include:

1. PassThroughMergePolicy—the entry will be added if there is no existing entry for the key;

2. PutIfAbsentMapMergePolicy—the entry will be added if the merging entry doesn't exist in the cluster;

3. HigherHitsMapMergePolicy—the entry with the higher hits wins, Hazelcast keeping track of some stats for each key; and 4. LatestUpdateMapMergePolicy—the entry with the latest update wins (by timestamp).

It should be noted that in Hazelcast it is also possible to utilize a plug-in user-specific merge policy. This can be done by implementing an interface available through Hazelcast's website, for example, com.hazelcast.map.merge.MapMergePolicy.

C. Other Prior Art—Shapiro

In 2011, Shapiro described some common data types that can be replicated across multiple nodes consistently with minimal concurrency control. Please see Shapiro et al., "Convergent and Commutative Replicated Data Types," Bulletin of the European Association for Theoretical Computer Science, Number 104, June 2011 (hereinafter "Shapiro"). Shapiro discloses at least four data types for replication:

1. G-Set

The G-set is a set that only allows additions. Each node can broadcast additions that can reach other endpoints at any point in time with little regard for concurrency issues. It maintains the properties of a set in that an additional insert of the same value will do nothing.

2. 2P-Set

The 2P-set uses two G-Sets bound together to allow for removals. However, a restriction is imposed in that a removed value cannot be added again.

3. LWW-Set

The LWW-set is a 2P-Set except the set uses timestamps to pair adds with removes. The timestamps define an ordering such that only a later remove can remove an add operation.

4. OR-Set

The OR set is similar to the LWW-Set in that it tries to intelligently pair removes with add operations. An add operation generates a unique tag associated with the value. When a remove happens, all known tags for the value to be removed are marked as removed. If on inspection there are non-removed tags remaining, the value exists. Otherwise, the value does not exist.

The inventors observe that, it should be noted that while Shapiro describes operations for replication, there is no discussion on how to effectively bootstrap nodes in a replication scenario. Nevertheless, the inventors observe that an alternative process for bootstrapping can be inferred from Shapiro. Since sets are trivially mergeable, a process for bootstrapping a node could be envisioned as follows:

1. Start broadcast current changes to the new node; and
2. Copy the existing set content from some/all existing nodes to the new node, merging as follows:

A. For G-Sets (and derivatives), simply take the union;

B. For LWW-Sets, if a value exists in both the new changes and the existing values, take the latest timestamp. Otherwise, still take the union;

C. The OR-Set is similar to G-Sets except that instead of just taking a union of the set values, the values also contain sets of tags. A union should be performed across these sets.

III. Disadvantages of the Prior Art

The inventors observe that there are a few notable issues with the prior art discussed above that prevent solutions disclosed therein from being optimal. In this section, the general issues are first discussed, followed by an analysis of specific conventional approaches.

Resource Usage

Bootstrapping on a live system requires excess resource usage in conventional implementations. One typical solution to the merge process is to simply buffer up the new changes until a known snapshot of the existing data is copied over. This guarantees that all the changes will be performed under the exact same conditions as in every other datacenter. In Dynamo-like distributed systems (such as Cassandra and Riak) such an approach is called "hinted-handoff." One major drawback for this solution is the amount of overhead that will be incurred. Buffering changes for a significant amount of time will definitely lead to significant memory usage.

There is also a problem of visibility, in that as changes are buffered up, clients will also need to have access to the contents of the buffer to see the most up-to-date data. An availability aspect is also very important, in that the node that maintains a temporary buffer may fail, thereby causing data loss. Certainly trade-offs could be made for visibility, availability or performance, but the end result would still be sub-optimal.

Convergence Guarantee

Some disclosed prior art solutions do not provide a real clear guarantee that node contents will converge at some point after bootstrapping, even given a quiet period.

A. Cassandra Bootstrap

Due to an eventually consistent nature, distributed datastores must keep track of removals for some period of time in order to resolve conflicts. Multi-Version Concurrency Control (MVCC) is one of the common mechanisms to solve this problem. When an MVCC database (such as Cassandra, HBase, and CouchDB) needs to delete an item of data, it will not physically remove it, but instead mark the old data as obsolete.

Thus in MVCC, there are multiple versions of a stored item, but only one is the latest. This allows readers to access the data that was there when they began reading, even if it was modified or deleted part way through by someone else. It also allows the database to avoid the overhead of filling in holes in memory or disk structures.

Issues with MVCC are usually caused by a high number of active versions. Old versions of data records are no longer needed if they are no longer part of a snapshot that can be seen by any running transaction. These versions are obsolete and need to be removed from time to time to free up memory. The system must periodically sweep through and delete the old, obsolete data objects. This process is sometimes called compaction (see Cassandra and CouchDB), vacuum (see PostgreSQL), or adaptive flushing (see MySQL). It may often lead to stop-the-world pauses, blocking of writes or even complete unavailability of the database. The consequence of not doing compaction periodically is a high number of active versions, and that can lead to system slow-down, disk fill-up or out of memory issues.

It should also be noted that Cassandra transfers SSTables which are effectively internal serialized on-disk representation of data. This makes the solution tightly coupled with the storage implementation details.

B. Hazelcast Bootstrap

Hazelcast does not keep track of removed entries (that is, so-called "tombstones", such as in Dynamo-like systems). This means it is possible to accidentally "resurrect" a recently removed entry by applying an old value during synchronization. This can happen when a real-time remove operation comes before a snapshotted merge operation on the same key. It is not absolutely clear how such discrepancies are solved later, if solved at all. However, using anti-entropy mechanisms like read-repair would be a possible solution.

The LastUpdateMapMergePolicy discussed above could be made to work, however there would be some major issues:

Requiring precisely synchronized clocks is difficult in a WAN. The nodes in question are expected to have substantial geographical separation which complicates clock synchronization. Boot-time system clock synchronization is usually not enough, unfortunately. The problem can be partially solved by time synchronization services like NTP, but in practice it is difficult to get right: hardware failure can push clocks days into the future or past; virtualization can break kernel timekeeping; and misconfigured nodes may not have NTP enabled, or may not be able to reach upstream sources Supposing tombstones were kept to mitigate the above issue, there does not exist a clear path for removing the tombstones. For example, time-based removal (expiration) is subject to potential races. Keeping tombstones around permanently is a potential resource leak.

C. Convergent and Commutative Data Types

The data types described by Shapiro could be reasonably extended to perform bootstrapping. However, the main disadvantage is that maintenance of sets in the manner described by Shapiro can require unbounded memory consumption. There is no known production ready implementation of the described distributed sets.

Additionally, extending the described set implementations to work with key-value data presents a major complication. The set implementations depend on the fact that there is only one piece of data that matters: the key. By comparison, with key-value data, the important part is the mapping between the key and value. That is, a given key can be mapped to different values at different times. This makes the described merge strategies unsuitable.

IV. Concept

The present disclosure presents a solution to the efficiency issue in the key/value model. A bootstrap of a fresh node in a distributed system is provided in a time and space efficient manner while the system remains running, accepting new changes. A minimal amount of bookkeeping data is kept in memory while allowing concurrent updates to flow through the distributed memory to the new node completely unhindered.

Succinctly put, the present disclosure reveals a bootstrapped node that in a semi-active state accepts changes to key/value pairs while contemporaneously receiving historical key/value pairs in batches. When bootstrapping is complete, meaning that all historical data has been received, the new replica node can be already fully activated as either a read node or a read/write node in the distributed memory network.

Bootstrapping a new node in a distributed memory network in a time and space efficient manner includes firstly structuring a node in particular manner. Specifically, a node contains several subsystems. Initially, a node includes a Key/value storage backend (which may be, for example, Terracotta Big Memory by Software AG). A node also includes an Inter-node replication system (which may be, for example, Terracotta WAN Replication by Software AG). A node may optionally include client applications that are connected to the node and that perform reading and writing of data from the key/value storage system. It should be noted that while one implementation uses Software AG's Terracotta BigMemory with volatile RAM memory, another implementation uses non-volatile Hard Disk/Solid State Drive-based solutions.

Bootstrapping a new node, therefore, involves taking a node that has either no data or unknown data, and bringing it to a state in which it can service the requests of clients connected to it. In order to do this according to a known technique, Terracotta WAN Replication initially designates one single node as the master node. This "master node" is the node that performs coordination of the bootstrapping, from time-to-time, of each of the new nodes.

Specifically, the master node is responsible for providing a definitively ordered stream of updates. In order to properly bootstrap a new node and place the new node into a state in which it can service the requests of clients connected to it, the master node must perform two tasks:
1. Providing the new the node with existing and/or historic data; and
2. Forwarding current changes to the new node, including changes in the historical data as well currently received changes in data.

It should be clear that applying current changes to the new node is necessary in order to track the current state of key/value data that is to be replicated in the new node. Of course, providing the new node with previously existing, old data is also necessary so that the new node will have the key/value that has not been modified. Unmodified data may include static data that is written only once or very infrequently.

One conventional approach in reconciling the providing of existing data and applying current changes is to copy over all the existing data first, while buffering up all current changes. Subsequently, after all existing and/or historic data is applied, all the buffered up changes are applied. In a small system, this approach would likely be effective. However on a larger scale, the amount of time required to copy the existing data would mean that even a low update rate would cause the buffer to be very large. Given the large scale use cases the present disclosure envisions, this buffering approach would be infeasible.

A more suitable approach used herein involves exploiting the specific characteristics of a key/value storage datastore, where the last write is the only relevant action to the key, to service mutations immediately. This key/value approach removes the need for buffering, thereby reducing the resource footprint considerably. Of course under the key/value approach, removed keys will need to be preserved. However, preservation of removed keys can be optimized by aggressive pruning of the removed set and by clearing entries from the removed after either the old data has been filtered or a new put command is applied to a same key. Compared to a full MVCC implementation, the key/value approach is far more lightweight.

It should be noted that in the key/value approach, the bootstrap process is done with minimal added strain on the system. No extra locking or synchronization needs to be done, hence the impact will be limited to the load generated by copying the existing data. While not insignificant, the copying can be regarded as a background process to be run on a lower priority than processing new data, thereby lessening the perceived performance impact on the system. More details of the concept of the key/value bootstrapping approach are now provided.

A. Handling Current Changes

The set of current changes allowed in the key/value bootstrapping approach is limited to only two functions: 1) Put (key, value); and 2) Remove (key). These two functions can make handling current changes very simple. Since each action is entirely self-contained, that is to say there is no dependence on the current state, all current changes can be applied to a fresh map.

Put operations (or "puts") over an existing key yield the same result whether or not the previous key/value mapping exists in the bootstrapping node. This means that it is unnecessary to buffer puts. Rather, a blank map can be created and puts can be applied normally while the rest of the bootstrapping process happens in the background.

It should be noted that in processing current changes, the current changes can be provided in either a sequencing approach or a parallel approach. In the sequencing approach, current changes are provided first to a master node, and then the master node provides the changes to a provisioned node. Alternatively, in a parallel approach both the master node and the provisioned node receive simultaneously received the current changes to the existing key/value entries. Under either approach, one current changes are received at both nodes, processing is the same thereafter.

Figure 2:
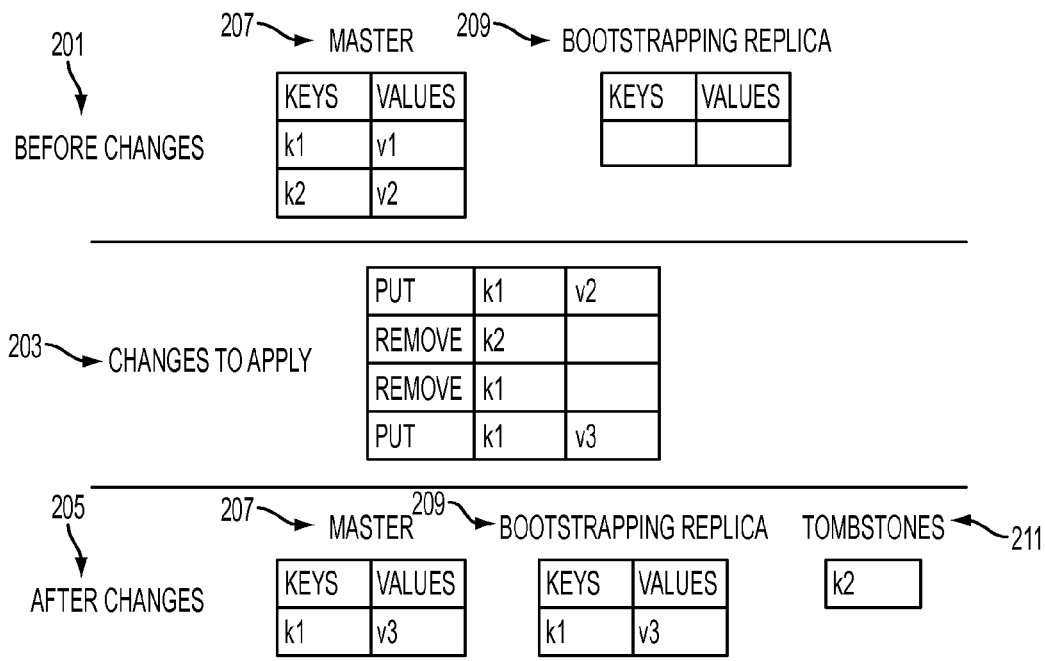
FIG. 2 is a diagram illustrating remove operations in a key/value bootstrapping process.

The following section discusses FIG. 1, in connection with put operations in a key/value bootstrapping, and FIG. 2, in connection with remove operations in a key/value bootstrapping process. FIG. 1, which is a diagram illustrating put operations in a key/value bootstrapping process, is now described using representative example which illustrate the concepts. Key value pairs for the master node 107 and the bootstrapping replica node 109 (that is to say, the new node) are shown before any current changes 101 are made, as well as after current changes 105 are made. The current changes to apply 103 are also shown.

Thus before any changes 101 are made, the master node 107 shows key/value pairs of (k1, v1) and (k2, v2). The replica/new node 109 as mentioned above begins as empty, with a blank map. The current changes 103 include putting key/value pairs (k1, v2), (k3, v3), and (k1, v3). As mentioned above, only the last change in key/value pairs are relevant so these new puts are added directly to both the master node 107 and the bootstrapping replica node 109.

When the operation Put (k1, v2) is applied, the key/value pair (k1, v2) replaces the key/value pair (k1, v1) in the master node 107, and is added to the bootstrapping replica node 109. When the operation Put (k3, v3) is applied, the key/value pair (k3, v3) is added to both the master node 107 and the bootstrapping replica node 109. When the operation Put (k1, v3) is applied, the key/value pair (k1, v3) replaces the key/value pair (k1, v2) existing in both the master node 107 and the bootstrapping replica node 109 as a result of the Put (k1, v2) operation.

Thus after the changes 105 are applied, the bootstrapping replica node 109 has the key value pairs (k3, v3) and (k1, v3) resulting from the add generated by the Put (k3, v3) operation and the replacement generated by the Put (k1, v3) operation. The master node 107 contains all the key/value pairs found on the bootstrapping replica node 109 in addition to the value pair (k2, v2) which was never effected by any put operations.

Handling remove operations (or "removes") in the key/value bootstrapping approach can be a bit trickier. Specifically, while current changes can be made without any tracking of removes, historical data will be affected if removes are not somehow recorded. Thus, removes can be saved using a temporary set of tombstones. Once bootstrapping is complete, the set of tombstones may be deleted.

FIG. 2, which is a diagram illustrating remove operations in a key/value bootstrapping process, is now described. Key value pairs for the master node 207 and the bootstrapping replica nod 209 (that is to say, the new node) are shown before any current changes 201 are made, as well as after current changes 205 are made. The current changes to apply 203 are also shown.

Thus before any changes 201 are made, the master node 207 shows key/value pairs of (k1, v1) and (k2, v2). The replica/new node 209 begins as empty, with a blank map. The current changes 203 include putting key/value pair (k1, v2), removing k2, removing k1, and putting key value pair (k1, v3).

When the operation Put (k1, v2) is applied, the key/value pair (k1, v2) replaces the key/value pair (k1, v1) in the master node 207, and is added to the bootstrapping replica node 209. When the remove operation Remove (k2) is applied, the key/value pair (k2, v2) is removed from the master 207, and has no effect on the bootstrapping replica node 209 as the key k2 had not been previously recorded. Simultaneously, the key k2 is recorded in the tombstone set 211.

When the remove operation Remove (k1) is applied, the key/value pair (k1, v2), added by the Put (k1, v2) operation, is removed from both the master node 207 and the bootstrapping replica node 209. Thus both the master node 207 and the bootstrapping replica node 209 are empty at this time (not shown). Additionally, the key k1 is added to the tombstone set 211 such that the tombstone set contains the keys k2, k1 (not shown).

When the operation Put (k1, v3) is applied, the key/value pair (k1, v3) is added to both the empty master node 207 and to the empty bootstrapping replica node 209. Simultaneously, the key k1 is removed from the tombstone set 211, leaving only the key k2 in the tombstone set 211. This result is seen in the master 207, the bootstrapping replica 209, and the tombstone set 211 after the changes 205 are made. Although not necessarily seen in this example, by storing the key k2 in the tombstone set 211, any historical data associate with the key k2 would not be copied to the replica node 209 because of the subsequent remove operation Remove (k2).

B. Copying Historic Data

While applying the current puts or removes keeps the bootstrapping node up-to-date with respect to current events, any data that has not been updated will not exist on the bootstrapping node. To fill in these gaps, the existing data must be copied over to the bootstrapping node.

In order to prevent overwriting recently updated data with copied over historic data, the historic data must be properly merged. Again, however, due to the simplicity of the key/value bootstrapping model, the merge may be easy. If particular key/value data already exists in the replica map, it can be assumed to be the same as or newer than the historic data. Hence all that is needed is a PutIfAbsent operation.

Unfortunately, the PutIfAbsent operation can cause a problem with removed entries. Specifically, after a successful remove of a key, no mapping will exist for the key in the new replica node. A PutIfAbsent merge of old data could erroneously insert an entry when it should remain removed. The solution to this issue is a check of the temporary set of keys already saved as a tombstone set.

Figure 3:
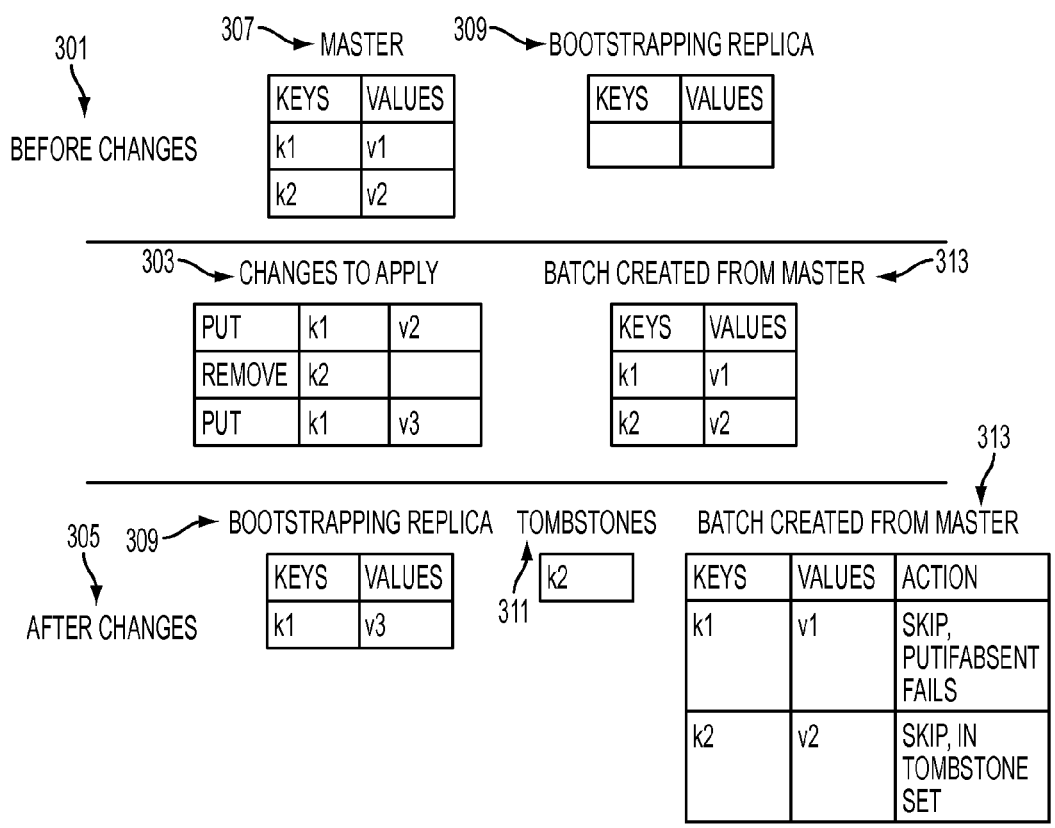
FIG. 3 is a diagram illustrating a copying historical data operation in a key/value bootstrapping process.

FIG. 3, which is a diagram illustrating a copying historical data operation in a key/value bootstrapping process, is now described. Specifically, FIG. 3 illustrates that before any changes 301 are made, the master node 307 shows key/value pairs of (k1, v1) and (k2, v2). The replica/new node 309 begins as empty, with a blank map. The current changes 303 to be applied include putting key/value pair (k1, v2), removing key k2, and putting key/value pair (k1, v3).

When the operation Put (k1, v2) is applied, the key/value pair (k1, v2) is added to the bootstrapping replica node 309 (not shown) and the master node 307 (not shown). When the remove operation Remove (k2) is applied, there is no effect on the bootstrapping replica node 309 as the key k2 had not been previously recorded in the bootstrapping replica node 309. However, the key value pair (k2, v2) would be removed from the master 307 (not shown). The key k2, however, is recorded in the tombstone set 311.

When the operation Put (k1, v3) is applied, the key/value pair (k1, v3) replaces, in the bootstrapping replica node 309, the key/value pair (k1, v2) that was added to the bootstrapping replica node 309 by the Put (k1, v2) operation. The same replacement would be made in the master node 307, although this is not shown. Thus after the changes 305 are made, the bootstrapping replica node 309 and the master node 307 (not shown) simply contain the key/value pair (k1, v3).

Prior to the current changes 303 being applied, a batch 313 of historical data is created based on the contents of the master node 307. The batch 313 of historical data is further provided to the bootstrapping replica node 309 after the changes 303 have been applied and the changes 305 made. Then bootstrapping replica node 309 applies the PutIfAbsent operation to historical data in the batch 313 created from the originally configured master 307. It should be noted that the PutIfAbsent operation actually occurs after a check of the tombstone set 311 such that a key value pair will not be added to the replica node 309 if a key has been removed in the current changes 303.

Thus as seen in the batch 313, a check of the tombstone set 311 is first performed to see if a key k1 is stored therein. Since the key k1 is not in the tombstone set 311, an operation PutIfAbsent (k1, v1) is applied. Since the key value pair (k1, v3) exists in the bootstrapping replica node 309, there is no absence. Thus the key value pair (k1, v1) does not replace the currently stored key value pair (k1, v3), and the key pair (k1, v1) is skipped.

Before a PutIfAbsent (k2, v2) is applied in the batch 313, a check must be performed of the tombstones set 311 to see if the key k2 is stored therein. Of course, the key k2 is stored in the tombstone set 311, and as such, the key/value pair (k2, v2) will also be skipped. Thus, in the example of FIG. 3, none of the historical data in the batch 313 is added to the bootstrapping replica node 309.

It should be noted that an advantageous property of the key/value bootstrapping solution is that it does not depend on the order of the historic data. Rather, the solution only depends on an iteration being complete and stable. For example, given a map with three entries (k1, v1), (k2, v2), and (k3, v3), removing the key/value pair (k2, v2) or replacing the key/value pair (k2, v2) with the key/value pair (k2, v3) should not cause the key/value pairs (k1, v1) and (k3, v3) to be excluded from iteration. In other systems, the expectation is that the storage is in a certain order, such as in an SSTable. The key/value bootstrapping solution disclosed herein does not require a particular ordering in the underlying system.

Figure 4A:
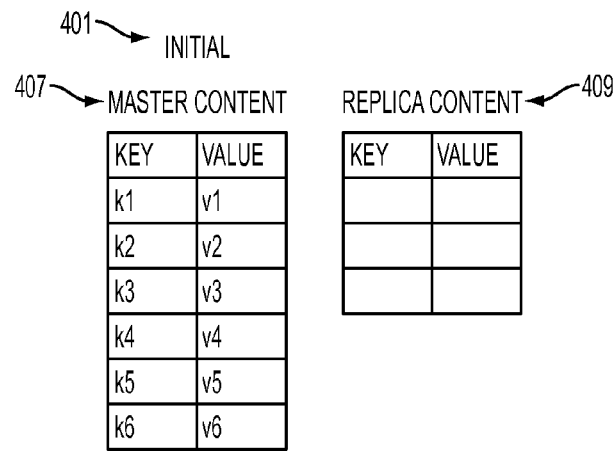

FIGS. 4A-4H, which are diagrams illustrating both providing current changes and batches of historical data in a bootstrapping process, are discussed and described. The examples in FIGS. 4A-4H may be simple but the concepts may be applied to more complex situations. In FIG. 4A, an initial state 401 of key/value pairs for the master node 407 and the bootstrapping replica node 409 (that is to say, the new node) are shown before any current changes are made or before any batches of historical data are shown.

In the initial state 401, after the replica node 409 joins, the replica node 409 is empty and the master node 407 may have mappings of key/value pairs. In the event that the replica node 409 was not empty in the initial state, it will simply be cleared first. In the present example, key/value pairs (k1, v1), (k2, v2), (k3, v3), (k4, v4), (k5, v5), and (k6, v6) are mapped in the master node 407.

Figure 4B:
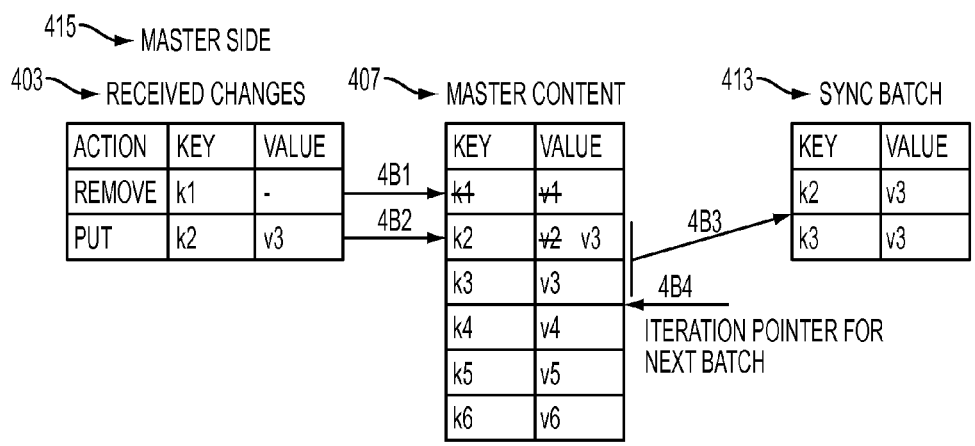

FIG. 4B illustrates that as the key/value bootstrapping process runs, there may be incoming received changes 403 on the master side 415 that are processed with respect to the master node 407. The current changes 403 will then be sent as-is to the replica side 417. Simultaneously the master node 407 will be creating sync batches 413 of existing values to also be sent to the replica node 409.

Thus in FIG. 4B when the operation Remove (k1) is applied in step 4B1, the key value pair (k1, v1) is deleted from the master node 407. When the operation Put (k2, v3) is applied in step 4B2, the key/value pair (k2, v2) in the master node 407 is replaced with the key/value pair (k2, v3). In step 4B3, entries from the master node 407 are saved to the sync batch 413.

Entries from the master node 407 are saved as iterated up until the size (two in this example) of the sync batch 413 is reached. Since key k1 has been deleted, key value pairs are saved up through key k3. A sync batch 413 thus initially stores key/value pairs (k2, v3) and (k3, v3). In step 4B4, an iteration pointer indicates the key/value pair to be processed in the next sync batch. Thus, the iteration pointer points to key value pair (k4, v4) in the master node 407.

It should be noted that in FIG. 4B for illustrative purposes the keys in the master node 407 are sorted, and iteration proceeds from top (key k2) to bottom (key k3). This is not required for the process to work. All that is required is that iteration will reach every key/value pair that is initially in the master node 407, and that it is still there by the time iteration ends.

Figure 4C:
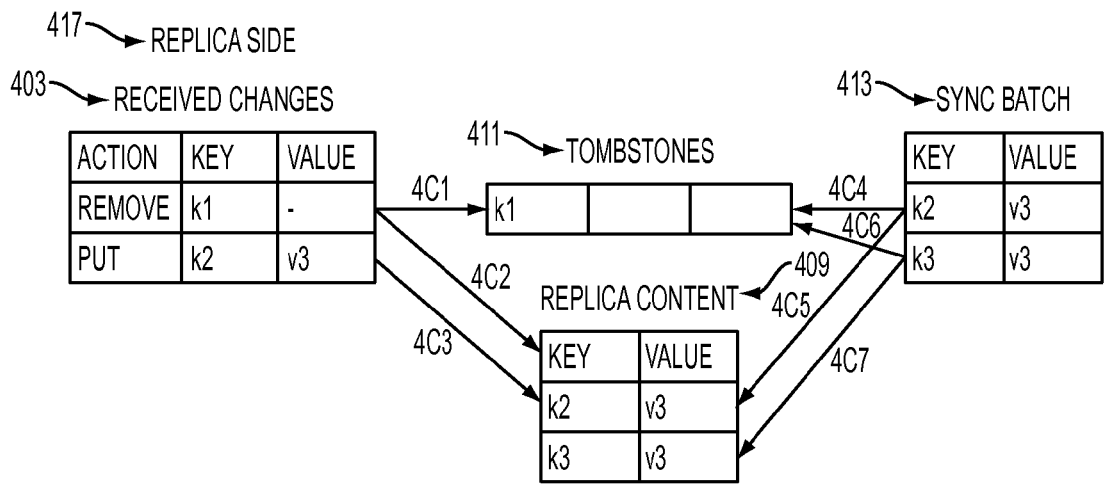

FIG. 4C illustrates the processing at the replica side 417 of the received changes 403 and the sync batch 413 of historical data. In step 4C1, the key k1 is added to the tombstone set 411 based on the Remove (k1) operation in the received changes 403. In step 4C2, key k1 is to be removed from the replica node 409. However, because no key/value pair is initially found in the replica node 409, there is nothing to remove. In step 4C3, the Put (k2, v3) operation in the received changes 403 is applied, and the key/value pair (k2, v3) is mapped to the replica node 409.

After the received changes 403 are processed, the sync batch 413 is processed. In step 4C4, the tombstone set 411 is checked to see if the key k2 has been previously removed. As only the key k1 has been removed, processing moves to step 4C5 where an operation PutIfAbsent (k2, v3) is applied to the replica node 409. Since the replica node 409 already stores a key k2, the key value pair (k2, v3) in the sync batch 413 is not further added to the replica node 409.

In step 4C6, the tombstone set 411 is checked to see if the key k3 has been previously removed. As only the key k1 has been removed, processing moves to step 4C7 where an operation PutIfAbsent (k3, v3) is applied to the replica node 409. Since the replica node 409 does not already store a key k3, the key value pair (k3, v3) in the sync batch 413 is further added to the replica node 409.

It should be noted that on both the master side 415 and the replica side 417, processing of the received changes 403 and of the sync batches 413 occurs simultaneously. The processing does not occur in a particular order as might be assumed from the description in this example. Rather, the fact that changes 403 have been described as being processed first is only a matter of descriptive convenience.

Figure 4D:
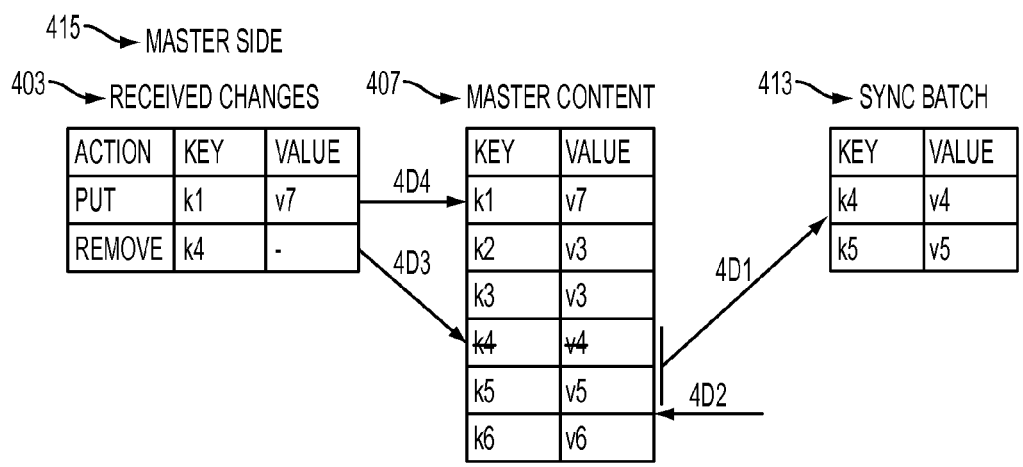

FIG. 4D illustrates that there are additional incoming received changes 403 on the master side 415 that must be processed with respect to the master node 407. The received changes 403 will additionally be sent as-is to the replica side 417. Simultaneously the master node 407 will continue creating sync batches 413 of existing values to also be sent to the replica node 409. In order to demonstrate that creation of batches 413 and processing of received changes 403 can be performed in any order, the creation of the batch 413 in FIG. 4D will be described first.

Entries from the master node 407 are saved as iterated up until the size of the sync batch 413 is reached. Iteration begins from the key/pair value pointed to by the iteration pointer, which is key value pair (k4, v4). In step 4D1, the key/value pair (k4, v4) is thus added to the sync batch 413. Iteration continues to the next key value pair (k5, v5), the pair being also added to the sync batch 413. In step 4D2, the iteration pointer is moved to indicate the key/value pair to be processed in the next sync batch. Specifically, the iteration pointer points to key value pair (k5, v5) in the master node 407.

Turning to processing of the changes 403, when the operation Remove (k4) is applied in step 4D3, the key value pair (k4, v4) is deleted from the master node 407. When the operation Put (k1, v7) is applied in step 4D4, the key/value pair (k1, v7) is added to the master node 407. The key k1 has previously been deleted from the master node 407.

Figure 4E:
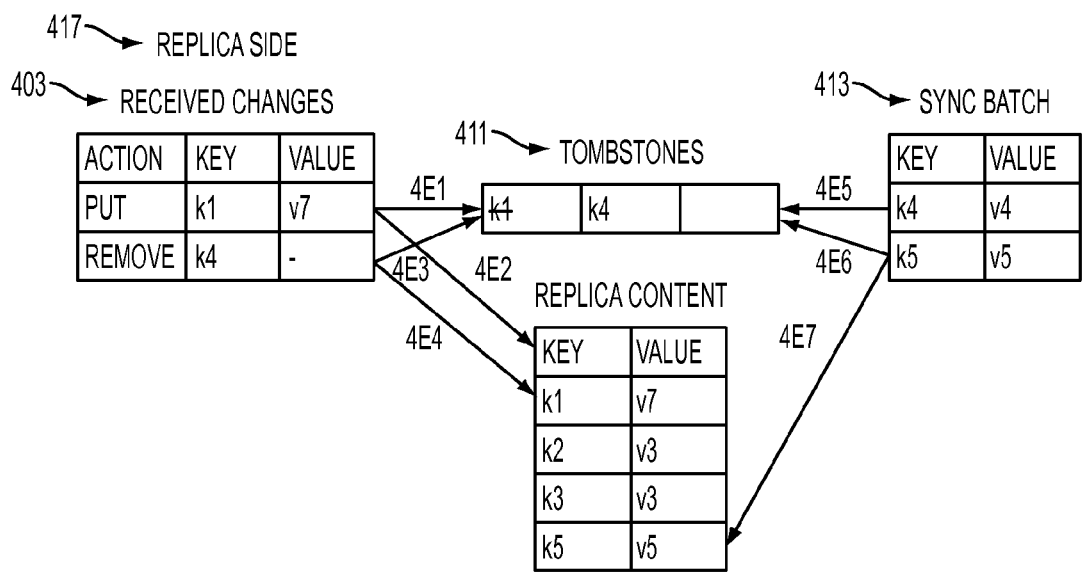

FIG. 4E illustrates the processing at the replica side 417 of the most recently received changes 403 and the most recent sync batch 413 of historical data. In step 4E1, the key k4 is added to the tombstone set 411 based on the Remove (k4) operation in the most received changes 403. In step 4E2, the key k4 is to be removed from the replica node 409. However, because no key/value pair is found in the replica node 409, there is nothing to remove. In step 4E3, the key k1 is removed from the tombstone set 411 based on the fact that the new operation Put (k1, v7) indicates an add operation to the replica node 409. In step 4E4, the operation Put (k1, v7) is applied and the key/value pair (k1, v7) is added to the replica node 409.

Processing of the most recent historical data in the sync batch 413 also occurs. In step 4E5, the tombstone set 411 is checked to see if the key k4 has been previously removed. As the key k4 is found in the tombstone set 411, an operation PutIfAbsent (k4, v4) is not performed, and the key/pair value (k4, v4) is simply skipped. As well, the key k4 in the tombstone set 411 is removed since its job in filtering the key k4 in the sync batch from the sync batch.

In step 4E6, the tombstone set 411 is checked to see if the key k5 has been previously removed. As the key k5 is not found in the tombstone set 411, an operation PutIfAbsent (k5, v5) is performed at step 4E7. The key/pair value (k5, v5) is thus added to the replica node 409.

Figure 4F:
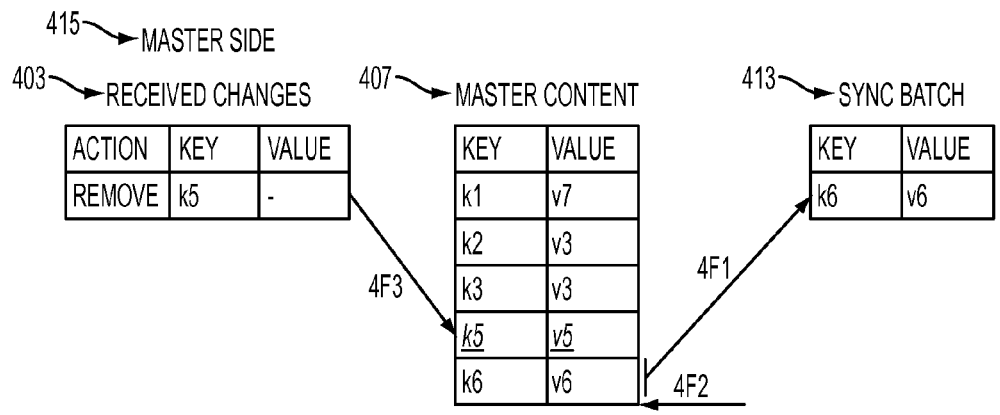

FIG. 4F illustrates that there are additional incoming received changes 403 on the master side 415 that must be processed with respect to the master node 407. The received changes 403 will additionally be sent as-is to the replica side 417. Simultaneously, the master node 407 will continue creating sync batches 413 of existing values to also be sent to the replica node 409.

Entries from the master node 407 are saved as iterated up until the size of the sync batch 413 is reached. Iteration begins from the key/pair value pointed to by the iteration pointer, which is key value pair (k6, v6). In step 4F1, the key/value pair (k6, v6) is thus added to the sync batch 413. Iteration would normally continue to a next key value pair, but at step 4F2 the iteration pointer reaches the end of the key/values pairs in the master node 407. This indicates that the current batch 413 is the final batch. Turning to processing of the changes 403, when the operation Remove (k5) is applied the key value pair (k5, v5) is deleted from the master node 407 in step 4F3.

Figure 4G:
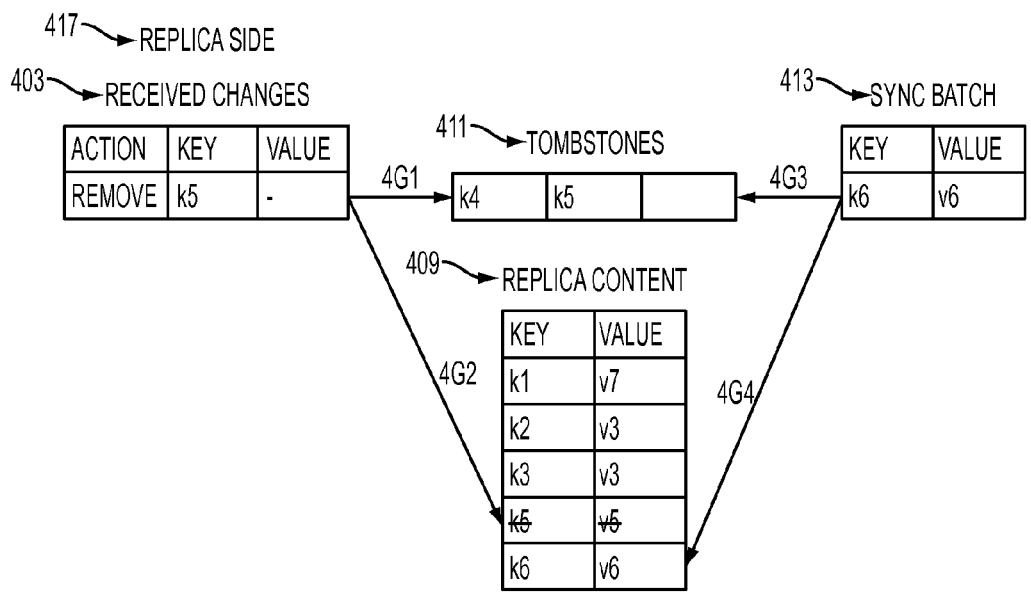

FIG. 4G illustrates the processing at the replica side 417 of the most recently received changes 403 and the most recent sync batch 413 of historical data. In step 4G1, the key k5 is added to the tombstone set 411 based on the Remove (k5) operation in the most recently received changes 403. Then in step 4G2, the key k5 is removed from the replica node 409.

Processing of the most recent historical data in the sync batch 413 also occurs. In step 4G3, the tombstone set 411 is checked to see if the key k6 has been previously removed. As the key k6 is not found in the tombstone set 411, an operation PutIfAbsent (k6, v6) is performed at step 4G4. As the key/value pair (k6, v6) is absent from the replica node 409, the key/value (k6, v6) is then added to the replica node 409.

FIG. 4H illustrates a final state 419 of both the master node 407 and the replica node 409. As can be seen, the master node 407 and the replica node 409 have the same key/value pairs. It should be clearly understood that the order of processing of the synch batch 413 and the received changes 403, both on the master side 415 and on the replica side 417, is irrelevant to the ultimate key/value pair makeup of the master node 407 and the replica node 409. That is to say, the master node 407 and the replica node 409 will have the same key/value pairs in the final state 419 irrespective of the order of processing and due to simultaneous processing.

C. Control System

Figure 5:
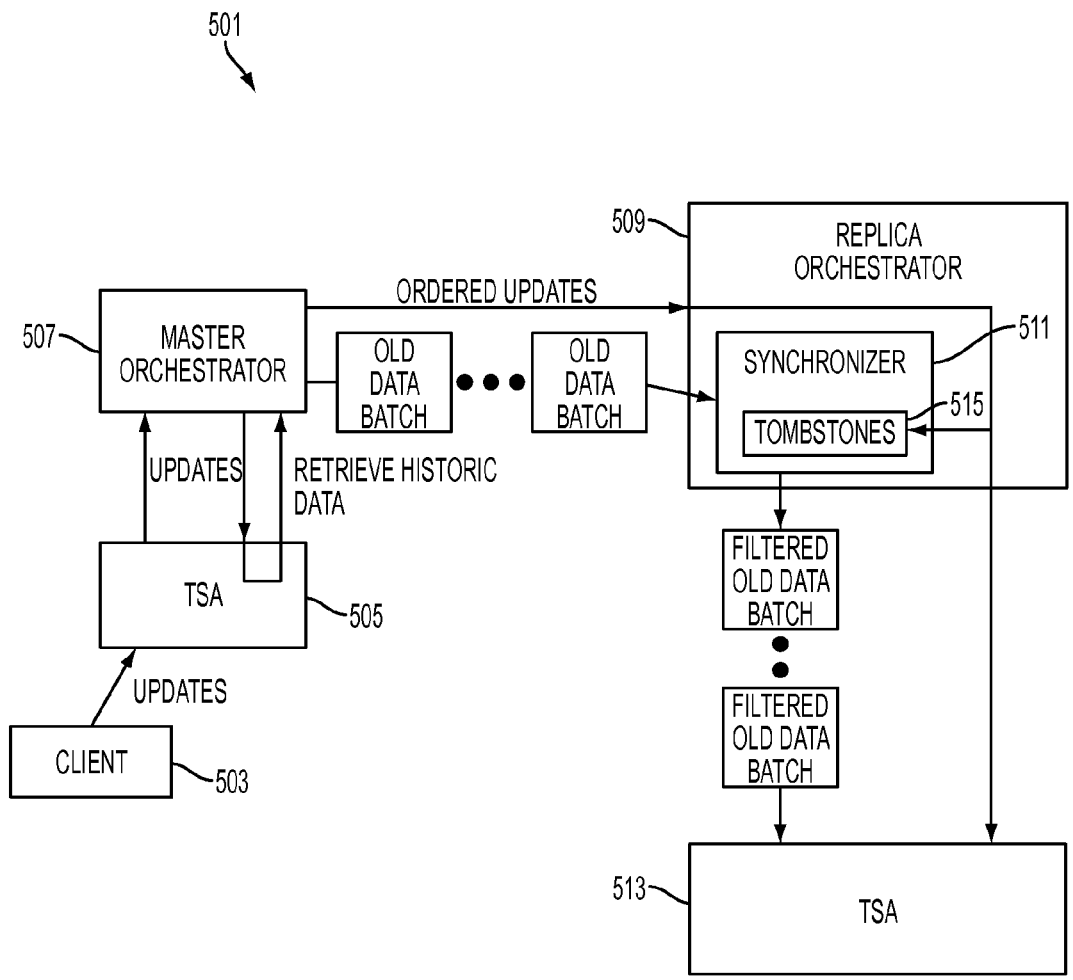
FIG. 5 is a block diagram illustrating an overview of a key/value bootstrapping system.

FIG. 5, which is a block diagram illustrating an overview of an example key/value bootstrapping system 501, is now described. In this example, the key/value bootstrapping system 501 includes a master orchestrator 507, which operates at a master node and is implemented on a processor of the master node, and a replica orchestrator 509, which operates on each replica node and is implemented on a processor of the replica node. The data of key/value structures accessed by the master orchestrator 507 may be stored in storage arrays, for example, represented herein by one or more Terracotta Server Arrays (TSA) 505. Further, the replica orchestrator 509 stores replicated key/value structures in second array, for example, represented herein by a second TSA 513.

As can be seen in FIG. 5, the master orchestrator 507 will transmit both ordered current updates and old data batches to the replica orchestrator 509. The master orchestrator 507 obtains the updates from the TSA 505, which further obtains the updates from a client 503. The client 503 initiates all updates in accordance with known techniques. The master orchestrator 507 creates the old data batches from historic data that is retrieved from the TSA 505, upon request from the master orchestrator 507 to the TSA 505.

In the replica orchestrator 509, a synchronizer 511 synchronizes the old batch data with the current updates, in part using the tombstone set 515 that tracks deleted keys as further described herein. Filtered old data batches can be thus created. The replica orchestrator 509 provides the filtered old data batches and the current updates to the second TSA 513 for storage.

In the herein disclosed system, data at each node, including a master node, may be stored in a clustered key/value pair store, such as a Terracotta Big Memory. A cluster for the master node can provide storage for existing and/or historic specific key-value data being replicated, and also store and/or apply onto the storage for the historic data, data related to an ordered stream of current stream updates. The TSA 505 may simply generate a stream of updates to the key/value map.

A Terracotta WAN Replication module may take the stream of current updates from its local Terracotta Big Memory cluster operating as the master (as well as possibly Big Memory clusters at one or more remote nodes), and can create the ordered stream of current updates to the replica node that stores replicated key-value structures. Bootstrapping of replica nodes in this example can be conveniently thus implemented using the Terracotta WAN Replication module, or other processor similarly configured, combining the ordered stream of current updates and the existing key-value data pulled from a Terracotta Big Memory cluster as a master node.

V. Implementation

More details related to the implementation of a key/value bootstrapping system are now provided. Processes for the master node are discussed in connection with FIG. 6, as an example of the master-side node which has the master orchestrator, illustrated in FIG. 5, handling of a replica node joining the distributed memory network. Processes for the replica node, as an example of the replica-node-side which has the replica orchestrator of FIG. 5, are discussed in connection with FIG. 7, relating to processing of current updates received by the replica node; FIG. 8, regarding operation of the replica node related to receiving a sync batch message; and FIG. 9, concerning batch processing in the replica node.

It should be initially noted that when not be bootstrapped a WAN cluster can operate in two configurable modes: unidirectional (active-active) and bidirectional (active-passive). In the unidirectional mode clients in a master region are able to generate mutations (that is, adds and removes). The replica region acts only as a passive read-only follower. By comparison, in bidirectional mode, users from both regions can produce concurrent modifications. That is to say, in the bidirectional case, updates can also be made from regions that have been previously bootstrapped, While being bootstrapped, a new node (whether unidirectional or bidirectional) always works in "inactive" state. That is, a new node only accepts synchronization messages, but no queries/updates from users. Therefore, while bootstrapping only users in a master region trigger mutations.

Master regions are determined via a shared configuration file. The configuration will contain a list of master orchestrators (chosen by the user based on criteria specific to the use case) identified by hostname and port number. Replicas are not listed in the configuration file. Replica nodes read the shared configuration file to determine where to connect to the master.

A master orchestrator can initiate a bootstrapping protocol described herein with a replica, for example as in the following cases:
1. A new replica orchestrator begins a process to join the cluster, using conventional techniques;
2. A known replica orchestrator process restarts, wherein in accordance with known techniques a master wipes out all metadata about that replica (unregister) and starts a bootstrapping process, as it would for a new cluster member;

3. A network partition (disconnect, packets drop, long delays) between master and replica occurs, wherein if the communication failure exceeds pre-configured timeout and number of retries, according to known techniques a master unregisters the replica, and the replica automatically restarts and requests bootstrapping, as it would for a new cluster member; and 4. An unexpected fatal error occurs on the replica side, wherein according to known techniques the replica will be restarted and re-bootstrapped as described above.

The bootstrapping process (sometimes referred to herein as a "sync") stops when a master has successfully iterated over all cache entries, transferred them over the network to the replica orchestrator, and received confirmation that all cache entries have been successfully stored on the replica node side. If any error occurs during the sync, the master can for example abort the transfer and unregister the replica in which the bootstrapping was erroneous and therefore unsuccessful. The replica may issue another registration attempt later.

On a component level, the bootstrapping system can be regarded as consisting of two halves which are mutually coordinated: the master synchronizer and the replica synchronizer. Naturally, there can be a plurality of replica nodes each of which is mutually coordinated with the same master node; each replica node has its own replica synchronizer, and the master node has its master synchronizer which mutually coordinates with all of the replica nodes. In addition, a system is expected to exist that provides a key-value data storage and an ordered stream of updates. The key-value storage system (for example, Terracotta Big Memory) is expected to provide the following functions:

1. Basic map operations: put, remove, get;
2. Compare-and-swap type operation: putIfAbsent; and
3. Iterate all key-value mappings, such as an entry set (set of the key-value mappings) or a key set (set of all the keys to be used with the get operation).

In addition to the above features, a mutation listener such as provided by Terracotta Big Memory can be used in establishing the stream of updates. The master can implement a listener that can be registered to listen to changes as they happen. This is a specific use case, but it is not a requirement in a key/value bootstrapping system. The same concept can be applied if all updates to the key-value storage were passed through a queue. In that case the queue can be used to feed directly into the stream being forwarded from the master to the bootstrapping replica.

A. Master Side

The master serves as a coordinator for the bootstrapping process. The master is where changes and/or updates flow through to be ordered. The master also has access to the historic data. Replica nodes connect to the master in order to join the system.

In principle, any node can be the master. In practice, the master is generally in the datacenter where the change volume is the highest, just for performance reasons. However, the only actual requirements to be a master are:

1. The master has a complete copy of the historic data; and
2. There is only one master.

Figure 6:
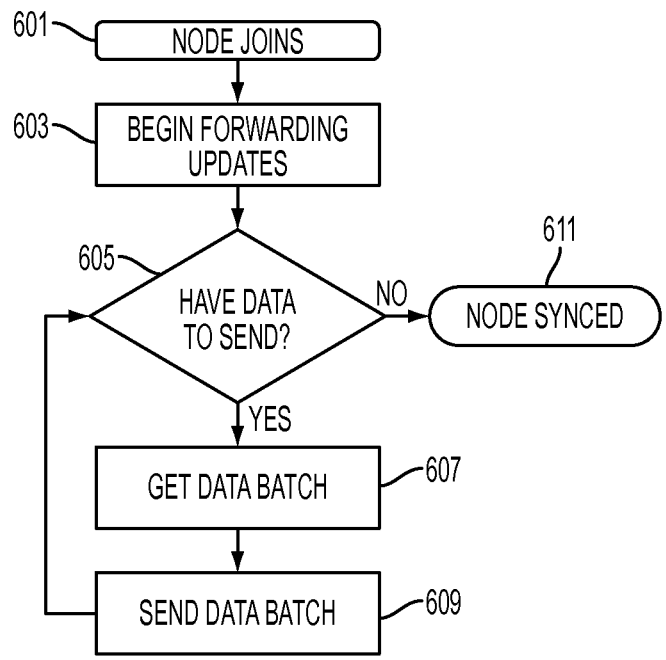
FIG. 6 is a flow diagram illustrating operation of the master node.

FIG. 6, which is a flow diagram of the operation of the master node when a node joins, is now described. When a new replica node joins 601 the system, the master node initiates a process. The process initially includes the master forwarding 603 an ordered stream of changes to the replica.

The master then determines 605 whether there is historical data to send to the new replica node.

When the master determines that there is historical data that needs to be sent to the new replica node (that is YES at 605), the master pulls 607 a batch of data from the storage system by iterating the key-value pairs. The master then sends 609 the batch of historical data to the replica node. Processing then returns to the master determining 605 whether there is historical data to be sent. Processing iterates until the master determines that there is no more historical data to be sent.

When the master determines that there is no more historical data to be sent (that is, NO at 605), the replica node is considered synced 611. Once the replica node is considered synced, the newly bootstrapped node can begin serving user requests. Specifically, the new node can perform reads if it is unidirectional or can perform both reads and writes if it is bidirectional.

It should be noted that batch size can be changed depending on the data characteristics. For example, if key-value pairs are large in a particular deployment, the batch size can be reduced to keep memory overhead for handling batches low. Conversely if key-value pairs are particularly small, batch sizes can be increased to reduce overhead in processing.

It should additionally be noted that throttling can be added between batches. Throttling can occur if necessary to reduce the performance impact on a running system. However since the herein disclosed key/value bootstrapping process does not need to buffer large amount of updates and/or changes, taking longer to perform the bootstrapping process does not jeopardize the stability of the system.

It should lastly be noted, with respect to the master, that data batches are not required to be sent only from the master. The master will of course need to coordinate the bootstrapping process. However, given a consistent way to partition the keys, it is possible for the master to distribute partitions across already bootstrapped replicas to aid in bootstrapping a new replica.

B. Replica Side

The replica side of the system provides the remote copy of the data on the master side. During normal operation (after sync is completed), the replica side of the system stays in sync with the master by continually receiving current updates. However, as discussed above, there are two streams of data that need to be processed on the replica side during bootstrapping. That is, the replica side must address current updates as well as batches of historical data in order to be fully bootstrapped and functional in the distributed memory network.

Figure 7:
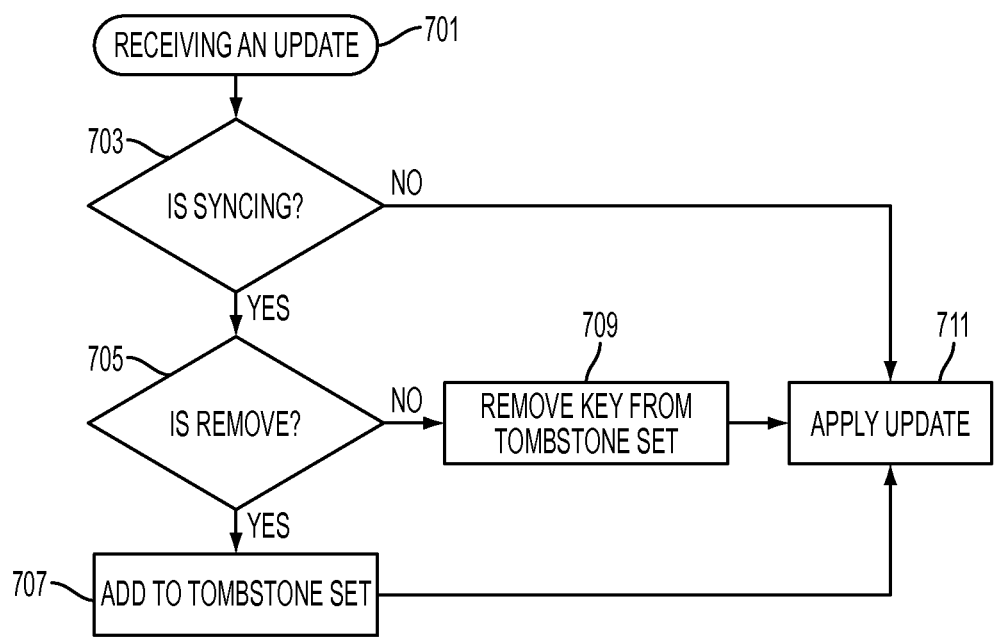
FIG. 7 is a flow diagram illustrating processing of current updates received by the replica node.
Figure 8:
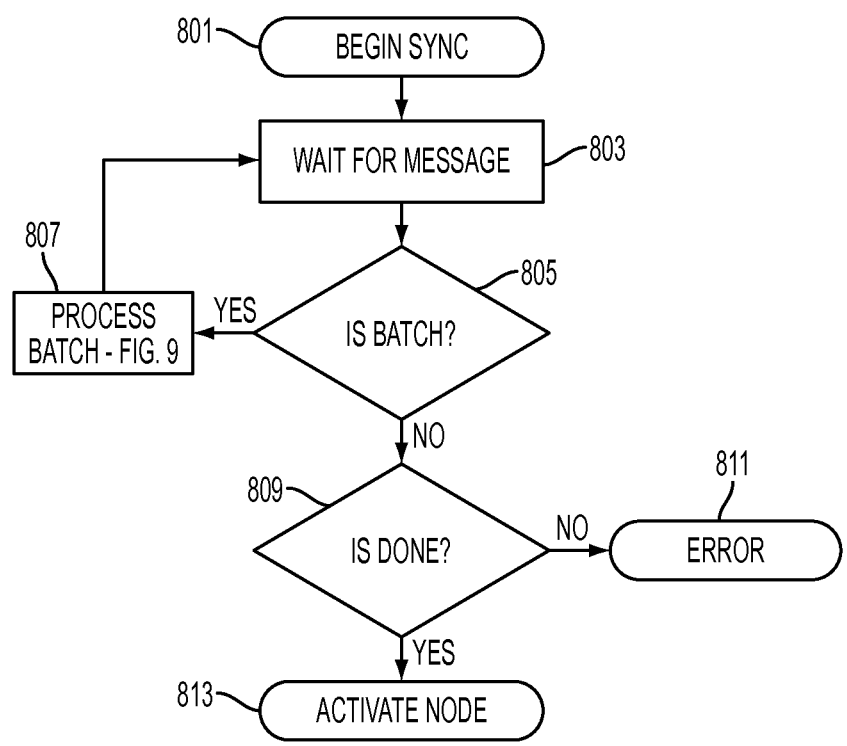
FIG. 8 is a flow diagram illustrating processing of batches of historical data received by the replica node.

FIG. 7, which is a flow diagram illustrating processing of current updates received by the replica node, is now described. The process of receiving an update begins when the replica side receives 701 an ordered update from the master. It is first determined whether the replica side is in the process of boot strap synching 703. If the replica side is not boot strap synching (that is, NO at 703), the replica node simply applies 709 the update, whether it be a remove operation or a put operation.

If the replica side is currently boot strap synching (that is, YES at 703), the replica node first determines whether the operation in the update from the master is a remove operation 705. If the operation is a remove operation (that is, YES at 705), the particular key needed to be removed is added 707 to the tombstone set, and the update is subsequently applied 711, meaning the key is deleted from the replica node. If the operation is not a remove operation (that is, NO at 705), the key is first removed 709 from the tombstone set if so present (for convenience, not illustrated as an option diamond). Subsequently, the update is simply applied 711, meaning a put-if-absent operation is applied. In either case, after applying 711 the update, the process returns.

FIG. 8, which is a flow diagram illustrating operation of the replica node related to receiving a sync batch message, is now described. The replica node begins 801 the bootstrapping process by simply waiting 803 for a message from the master. When a message is received, it is first determined whether the message indicates that a batch is received 805 or whether the message simply indicates a current change.

If the message indicates that a batch of historical data is provided (that is, YES at 805), the replica node processes 807 the batch as described below in FIG. 9, for the batch received process. Once the batch is processed, the replica node again waits 803 for messages. If the message indicates that a batch of historical data is not provided (that is, NO at 805), the replica node determines whether any current change processing is complete 809.

If no historical data is sent in a batch 805, completion of processing of current changes finalizes the bootstapping. Therefore if no batch is provided (that is, NO at 805), and when the processing of current changes is complete (that is, YES at 809), the node is activated 813, and ready for post-bootstrap processing. Of course if one or more of the current changes is not processed to completion (that is, NO at 809), then there is certainly an error 811. In that event, possible corrective measures may be undertaken as will be understood by one of skill, considering the discussion herein.

Figure 9:
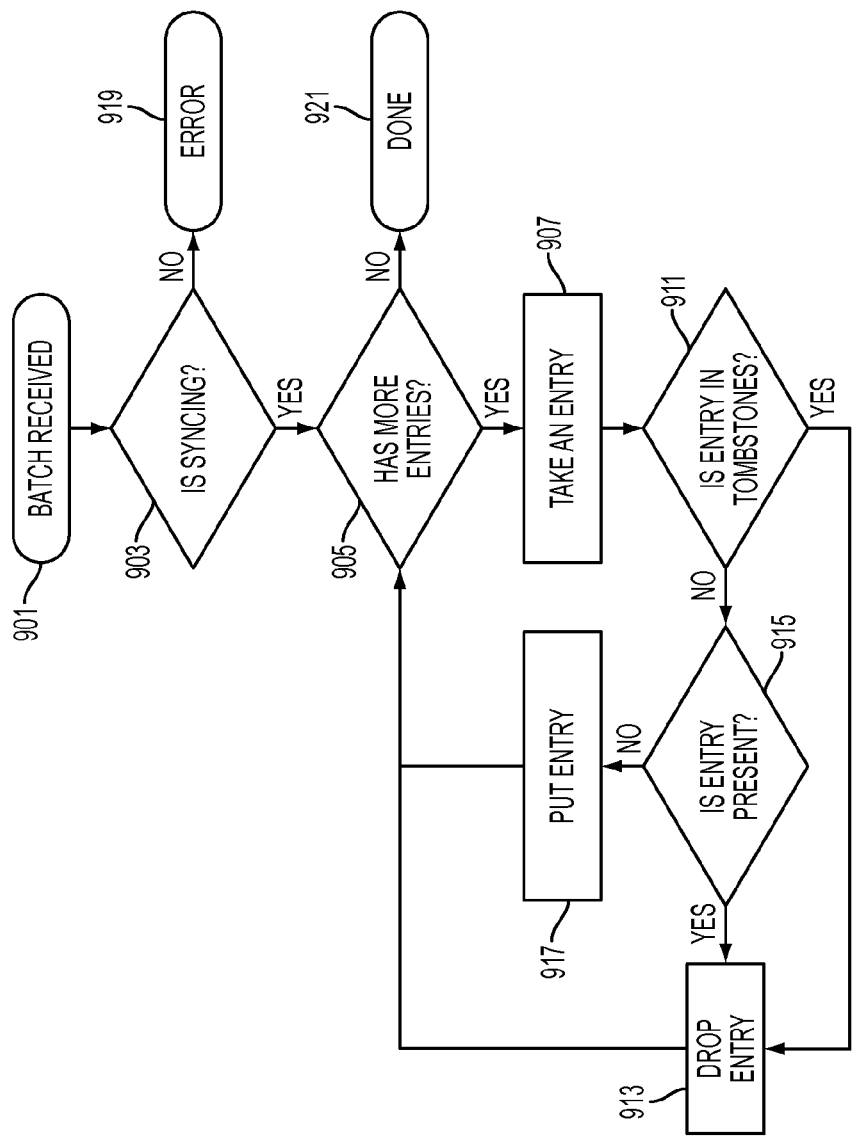
FIG. 9 is a flow diagram illustrating batch processing in the replica node.

FIG. 9, which is a flow diagram illustrating batch processing in the replica node, is now described. When a batch of historical key/value pairs is received 901, processing of the batch begins. Initially, a determination is made as to whether the batch is received during bootstrapping 903 a replica node. Batches of historical data should only be received during bootstrapping, so if a node is not in a bootstrapping state (NO at 903), there is certainly an error 919, and corrective measures may be undertaken.

If the replica mode is in a bootstrapping state (YES at 903), then a determination is made as to whether there are additional 905 key/value entries in the batch. If there are not any key/value pair entries (NO at 905), batch processing is complete and the processing ends 921. If there are additional historical key/value entries (YES at 905), a key/value pair entry is taken 907 from the group.

For the key/value entry taken 907 from the group, it is determined whether the key is an entry 911 in the tombstone. If the key is a tombstone set entry (YES at 911), the entry is dropped 913 and/or skipped. When the entry is dropped 913, processing returns to the determination of whether there are additional key/value entries 905 in the batch.

If the key in the key/value entry taken 907 from the group is not a tombstone set entry (NO at 911), a determination as to whether the key/value entry is present 915 in the replica node key/value pair datastore. If the key/value entry is not present in the key/value pair datastore (NO at 915), the key/value pair is absent and the key/value pair is put 917 into the key/value pair structure. If the key/value entry is present in the key/value pair datastore (YES at 915), the key/value pair is not absent and the key/value pair is simply dropped 913 and/or skipped. After the key/value entry taken 907 from the group is either put 917 or dropped 913, processing returns to the determination of whether there are additional key/value entries 905 in the batch, which repeats the loop until there are no more entries 921.

VI. Glossary

Terms as used herein are intended to be interpreted first, as understood to one of skill in the art at a first level, of distributed memory networks and more particularly bootstrapping nodes in a distributed memory network; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The terms "Bootstrap" or "Bootstrapping" as used herein refers to a process of providing initial configuration information to a newly joining node so it may successfully join a cluster. In this application the term "Bootstrap" is intended to be interpreted particularly as in the art of distributed memory networks, such that when the bootstrapping of a replica node is complete it has a complete replica of the distributed memory network and is considered to be able to join the cluster so as to be functional with the distributed memory.

The term "Cluster" as used herein refers to a set of loosely connected or tightly connected computers that work together so that may be viewed, in many respects, as a single system.

The expression "High Availability" or "HA" as used herein refers to a characteristic of a distributed system that can be reliably utilized with a minimum of down-time; such systems typically operate by harnessing redundant computers in groups or clusters that provide continued service when system components fail.

The expression "Hinted Handoff" as used herein refers to a buffering technique for dealing with node failure in a cluster in which neighboring nodes temporarily take over storage operations for a failed node; when the failed node returns to the cluster, the updates received by the neighboring nodes are handed off to it.

The expression "Merkle Tree" as used herein refers to a hash tree where leaves are hashes of the values of individual keys. Parent nodes higher in the tree are hashes of their respective children. The principal advantage of a Merkle Tree is that each branch of the tree can be checked independently without requiring nodes to download the entire data set.

The expression "Multi-version Concurrency Control" or "MVCC" as used herein refers to a protocol for resolving a situation where a database is being read at the same time the database is being written; in such a situation the read operation may yield a half-written or inconsistent piece of data; the MVCC is a concurrency control protocol where each user connected to the database sees a snapshot of the database at a particular instant in time; any changes made by a writer will not be seen by other users of the database until the changes have been completed.

The expression "Network Time Protocol" or "NTP" as used herein refers to a networking protocol for clock synchronization between computer systems over variable-latency data networks.

The expression "Read Repair" as used herein refers to an anti-entropy algorithm in an asynchronous distributed system; when a read query is made against a given key, the system performs a digest (hash) query against all the replicas of the key and pushes the most recent version to any out-of-date replicas, repairing them.

The expression "Sorted String Table" or "SSTable" as used herein refers to an abstraction used to efficiently store large numbers of key/value pairs while optimizing, for high throughput, sequential read/write workloads (spinning disks), implemented for example as an immutable map from string to string, in which the (key, value) pairs are sorted by key, and written sequentially.

The expression "Terracotta Big Memory" as used herein is a distributed cache solution sold by SoftwareAG, Inc.; the product provides a scalable implementation of cache capable of handling multiple terabytes spread across a multiple active cluster.

The expression "Terracotta Server Array" or "TSA" as used herein refers to server nodes of Terracotta Big Memory; the data in Big Memory is distributed across one or more nodes.

The term "Tombstone" as used herein refers to a deleted record in a replica of a distributed data store; a tombstone set is necessary because distributed data stores use eventual consistency, where only a subset of nodes, where the data is stored, must respond before an operation is considered to be successful. It should be noted that a tombstone itself is a single pointer to a removed key.

The expression "Wide Area Network" or "WAN" as used herein refers to a network that covers a broad area using telecommunication lines. Business and government entities utilize WANs to relay data among employees, clients, buyers, and suppliers from various geographical locations.

VII. Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; that is, processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for bootstrapping a replica node in a distributed memory network. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure disclosed above is generally conceived to be a self-consistent sequence of steps, executed by a processor, leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format at a client side; it is possible to utilize alternative display formats for interacting with a user and obtaining user instructions for example at a client so as to cause an update as discussed above.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of configuring a provisioned node, which is to be added into a distributed memory network, the method comprising:
    creating, by the provisioned node, a provisioned key/value map that is initially empty;
    performing, by the provisioned node and by a master node, which is an existing node in the distributed memory network in which the master node maintains existing key/value entries in an existing key/value map, an update cycle, including:
        receiving, by the master node and the provisioned node, a current change related to the existing key/value entries;
        when the current change is a remove operation of a specified key, storing, by the provisioned node, the specified key in a tombstone set, and when a key/value pair associated with the specified key is present in the provisioned key/value map, deleting from the provisioned key/value map, by the provisioned node, the key/value pair associated with the specified key that is present in the provisioned key/value map; and
        when the current change is a put operation of a specified key/value pair, and when a key of the specified key/value pair is present in the tombstone set, deleting, by the provisioned node the key of the specified key/value pair from the tombstone set, and putting, by the provisioned node, the specified key/value pair in the provisioned key/value map.

2. The method according to claim 1, wherein:
performing the update cycle further includes:
    when the current change is the remove operation of the specified key, and when another key/value pair associated with the specified key is present in the existing key/value map, removing, by the master node, the another key/value pair from the existing key/value map; and
    when the current change is the put operation of the specified key/value pair, putting, by the master node, the specified key/value pair in the existing key/value map.

3. The method according to claim 2, wherein:
performing the update cycle further includes:
    creating, by the master node, a batch of the existing key/value entries from the existing key/value map, a number of the existing key/value entries in the batch being equal to or less than a total number of the existing key/value entries in the existing key/value map; and
    providing by the master node to the provisioned node, the batch of the existing key/value entries.

4. The method according to claim 3, wherein:
performing the update cycle further includes:
    for each key/value entry in the batch, determining, by the provisioned node, whether a respective key of a respective key/value entry exists in the tombstone set;
    when the respective key does exist in the tombstone set, deleting, by the provisioned node, the respective key from the tombstone set and skipping, by the provisioned node, the respective key/value entry from further action or consideration; and
    when the respective key does not exist in the tombstone set, determining, by the provisioned node, whether the respective key/value entry is absent from the provisioned key/value map;
    when the respective key/value entry is absent from the provisioned key/value map, putting, by the provisioned node, the respective key/value entry into the provisioned key/value map; and
    when the respective key/value entry is not absent from the provisioned key/value map, skipping, by the provisioned node, the respective key/value entry from further action or consideration.

5. The method according to claim 4, wherein:
the update cycle is performed repeatedly until each key/value entry in the existing key/value map is consecutively included in a provided batch of existing key/value entries.

6. The method according to claim 5, wherein:
after the update cycle is performed repeatedly such that each key/value entry in the existing key/value map is consecutively included in a provided batch of existing key/value entries, the provisioned node is activated for accepting client input.

7. A distributed memory network comprising:
a first server array that implements an existing key/value map that includes existing key/value entries;
a master node that is operably linked to the first server array; and
a second server array that, when a node is newly provisioned as a provisioned node, becomes operably linked to the provisioned node and implements a provisioned key/value map that is initially in an empty state, wherein
the master node and the provisioned node perform an update cycle, including:
    the master node and the provisioned node receiving a current change related to the existing key/value entries;

when the current change is a remove operation of a specified key, the provisioned node storing the specified key in a tombstone set, and when a key/value pair associated with the specified key is present in the provisioned key/value map, the provisioned node deleting from the provisioned key/value map the key/value pair associated with the specified key that is present in the provisioned key/value map; and when the current change is a put operation of a specified key/value pair, and when a key of the specified key/value pair is present in the tombstone set, the provisioned node deleting the key of the specified key/value pair from the tombstone set, and the provisioned node putting the specified key/value pair in the provisioned key/value map.

8. The distributed memory network according to claim 7, wherein:

the update cycle further includes:
when the current change is the remove operation of the specified key, and when another key/value pair associated with the specified key is present in the existing key/value map, the master node removing the another key/value pair from the existing key/value map; and
when the current change is the put operation of the specified key/value pair, the master node putting the specified key/value pair in the existing key/value map.

9. The distributed memory network according to claim 8, wherein:

the update cycle further includes:
the master node creating a batch of the existing key/value entries from the existing key/value map, a number of the existing key/value entries in the batch being equal to or less than a total number of the existing key/value entries in the existing key/value map; and
the master node providing to the provisioned node the batch of the existing key/value entries.

10. The distributed memory network according to claim 9, wherein:

the update cycle further includes:
for each key/value entry in the batch, the provisioned node determining whether a respective key of a respective key/value entry exists in the tombstone set;
when the respective key does exist in the tombstone set, the provisioned node deleting the respective key from the tombstone set and skipping the respective key/value entry from further action or consideration; and
when the respective key does not exist in the tombstone set, the provisioned node determining whether the respective key/value entry is absent from the provisioned key/value map;
when the respective key/value entry is absent from the provisioned key/value map, the provisioned node putting the respective key/value entry into the provisioned key/value map; and
when the respective key/value entry is not absent from the provisioned key/value map, the provisioned node skipping the respective key/value entry from further action or consideration.

11. The distributed memory network according to claim 10, wherein:

the master node and the provisioned node perform the update cycle repeatedly until each key/value entry in the existing key/value map is consecutively included in a provided batch of existing key/value entries.

12. The distributed memory network according to claim 11, wherein:

after the master node and the provisioned node perform the update cycle repeatedly such that each key/value entry in the existing key/value map is consecutively included in a provided batch of existing key/value entries, the provisioned node is activated for accepting client input.

13. A non-transitory, computer-readable storage medium with instructions stored thereon, which when executed in part by a processor in a provisioned node, which is to be added into a distributed memory network, and in part by a processor in a master node, which is an existing node in the distributed memory network in which the master node maintains existing key/value entries in an existing key/value map, results in a method being performed, the method comprising:

creating, by the provisioned node, a provisioned key/value map that is initially empty;
performing, by the provisioned node and by the master node, an update cycle, including:
receiving, by the master node and the provisioned node, one or more changes a current change related to the existing key/value entries;
when the current change is a remove operation of a specified key, storing, by the provisioned node, the specified key in a tombstone set, and when a key/value pair associated with the specified key is present in the provisioned key/value map, deleting from the provisioned key/value map, by the provisioned node, the key/value pair associated with the specified key that is present in the provisioned key/value map; and
when the current change is a put operation of a specified key/value pair, and when a key of the specified key/value pair is present in the tombstone set, deleting, by the provisioned node the key of the specified key/value pair from the tombstone set, and putting, by the provisioned node, the specified key/value pair in the provisioned key/value map.

14. The non-transitory, computer-readable storage medium according to claim 13, wherein:

the update cycle further includes:
when the current change is the remove operation of the specified key, and when another key/value pair associated with the specified key is present in the existing key/value map, removing, by the master node, the another key/value pair from the existing key/value map; and
when the current change is the put operation of the specified key/value pair, putting, by the master node, the specified key/value pair in the existing key/value map.

15. The non-transitory, computer-readable storage medium according to claim 14, wherein:

performing the update cycle further includes:
creating, by the master node, a batch of the existing key/value entries from the existing key/value map, a number of the existing key/value entries in the batch being equal to or less than a total number of the existing key/value entries in the existing key/value map; and
providing by the master node to the provisioned node, the batch of the existing key/value entries.

16. The non-transitory, computer-readable storage medium according to claim 15, wherein:

the update cycle further includes:
for each key/value entry in the batch, determining, by the provisioned node, whether a respective key of a respective key/value entry exists in the tombstone set;
when the respective key does exist in the tombstone set, deleting, by the provisioned node, the respective key from the tombstone set, and skipping, by the provisioned node, the respective key/value entry from further action or consideration; and
when the respective key does not exist in the tombstone set, determining, by the provisioned node, whether the respective key/value entry is absent from the provisioned key/value map;
when the respective key/value entry is absent from the provisioned key/value map, putting, by the provisioned node, the respective key/value entry into the provisioned key/value map; and
when the respective key/value entry is not absent from the provisioned key/value map, skipping, by the provisioned node, the respective key/value entry from further action or consideration.

17. The non-transitory, computer-readable storage medium according to claim 16, wherein the method further comprises:
the update cycle being performed repeatedly until each key/value entry in the existing key/value map is consecutively included in a provided batch of existing key/value entries.

18. The non-transitory, computer-readable storage medium according to claim 17, wherein the method further comprises:
after the update cycle is performed repeatedly such that each key/value entry in the existing key/value map is consecutively included in a provided batch of existing key/value entries, activating the provisioned node for accepting client input.

* * * * *